Oct. 25, 1960 R. A. SCHOLTEN ET AL 2,958,019
MAGNETIC PAD ASSEMBLY
Filed Sept. 17, 1956  2 Sheets-Sheet 1
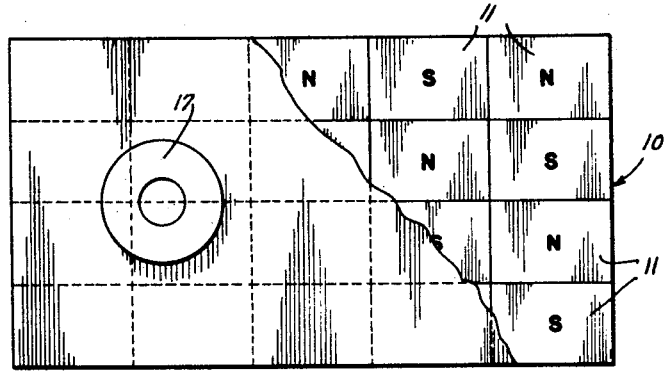
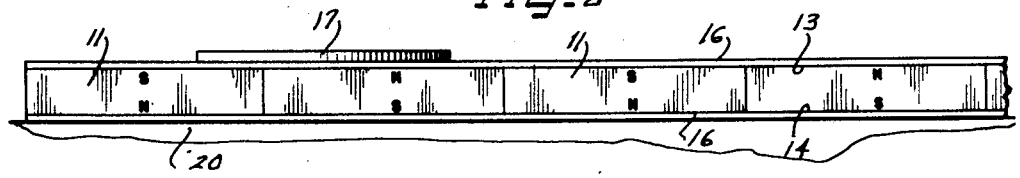
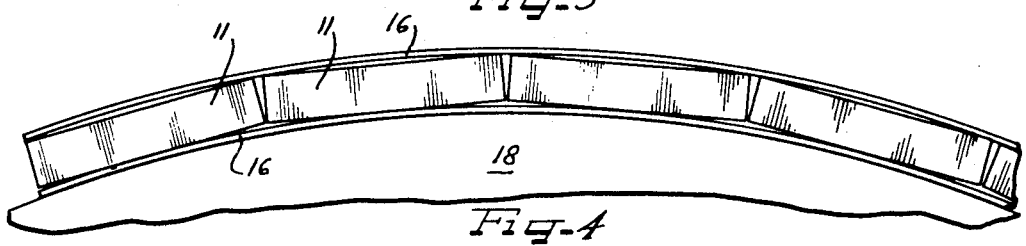
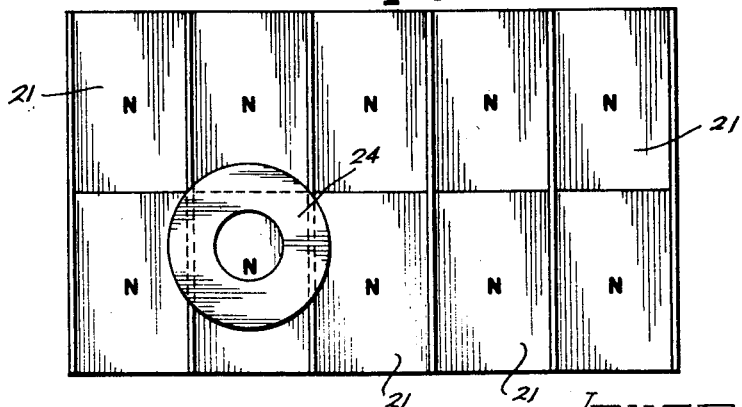
Inventors
RICHARD A. SCHOLTEN
CHARLES A. MAYNARD
by Attys.

Oct. 25, 1960
R. A. SCHOLTEN ET AL
2,958,019
MAGNETIC PAD ASSEMBLY
Filed Sept. 17, 1956
2 Sheets-Sheet 2
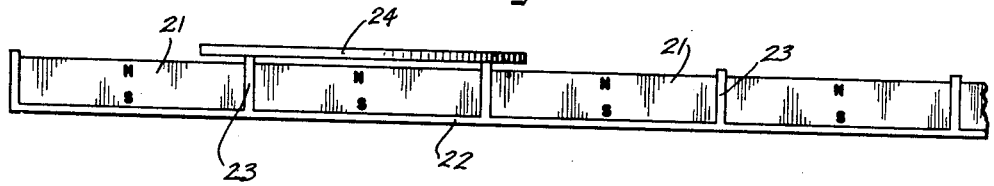
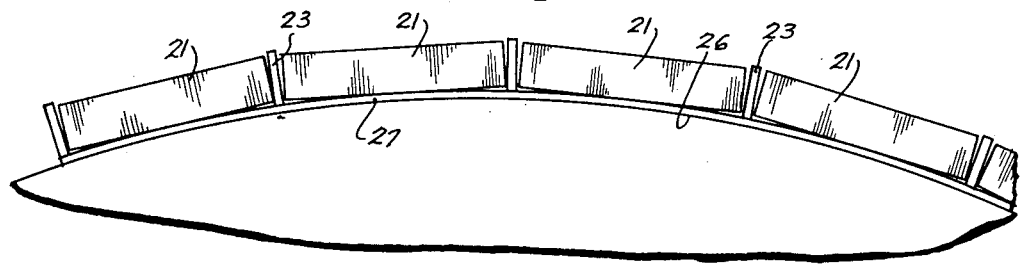
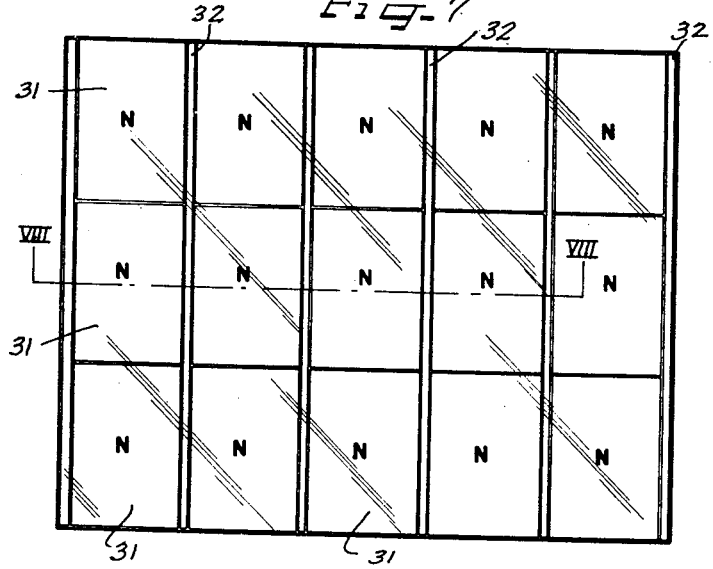
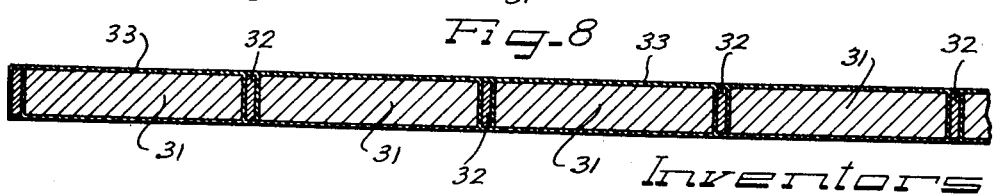
INVENTORS
RICHARD A. SCHOLTEN
CHARLES A. MAYNARD
by Attys.

United States Patent Office
2,958,019
Patented Oct. 25, 1960

2,958,019
MAGNETIC PAD ASSEMBLY

Richard A. Scholten and Charles A. Maynard, Valparaiso, Ind., assignors to Indiana General Corporation Filed Sept. 17, 1956, Ser. No. 610,342

2 Claims. (Cl. 317—159)

The present invention relates to magnetic pad assemblies and specifically is directed to assemblies having large effective magnetic areas per unit of thickness.

For some applications of permanent magnets, it would be desirable to provide a magnetic assembly adapted to be conformingly positioned on or in an arcuate surface such as the periphery of a steel drum. In most cases, however, it is not practical to embed permanent magnets directly into the surface of the drum and it would be more desirable to provide a magnetic assembly which can be readily applied to the periphery of the drum and readily removed therefrom. The magnetic assemblies of the present invention are particularly applicable to this type of use.

An object of the present invention is to provide an improved magnetic pad assembly having a large effective magnetic area per unit of thickness of the assembly.

Another object of the invention is to provide a magnetic pad assembly with a flexible support making the assembly readily conformable to non-planar surfaces.

Another object of the invention is to provide a simple but highly effective magnetic holding assembly having two opposed, relatively large holding areas.

A further description of the present invention will be made in conjunction with the attached sheet of drawings in which several embodiments of the invention are illustrated.

In the drawings:

Figure 1 is a plan view of one form of the present invention with portions thereof broken away for clarity;

Figure 2 is a view in elevation of the assembly shown in Figure 1;

Figure 3 is a fragmentary view in elevation illustrating the manner in which the assembly of Figures 1 and 2 can be associated with a non-planar surface;

Figure 4 is a plan view of a modified form of the present invention;

Figure 5 is a view in elevation of the assembly of Figure 4;

Figure 6 is a fragmentary view in elevation illustrating the manner in which an assembly like that of Figure 5 can be employed on an arcuate surface;

Figure 7 is a plan view of another form of the invention; and

Figure 8 is an enlarged cross-sectional view taken along the line VIII—VIII in Figure 7.

As shown on the drawings:

In Figure 1 reference numeral 10 indicates generally a magnetic pad assembly of the present invention which includes a plurality of wafer-type permanent magnets 11 arranged in side-by-side relation. The magnets 11 are preferably of the barium ferrite type which provide a very large area per unit of magnetic length. The wafer-type magnets 11 are magnetized along their smallest dimension, that is, along the thickness dimension of the rectangular wafer. As illustrated in both Figures 1 and 2, the magnets 11 are arranged so that they provide opposed planar magnetic surfaces 13 and 14. In the form of the invention shown in Figures 1 and 2, the wafer-type magnets are alternated such that the adjoining magnetic faces in the same plane provide faces of opposite magnetic polarity. In other words, the magnets are arranged so that the first magnet 11 in the series has its south pole uppermost, and the next its north pole uppermost, the third its south pole uppermost, and so on.

The permanent magnets 11 are disposed between a pair of thin, relatively flexible plates or sheets 16 composed of a non-magnetic material such as brass, synthetic resin, or the like. With this arrangement, magnetic attraction will occur on both surfaces of the sheets 16 and the holding force on one surface can be used to attach the magnetic pad to a ferromagnetic surface such as a ferromagnetic support 20. Then when an object such as a ferromagnetic washer 17 is disposed on one of the surfaces of the assembly, the magnetic attraction will provide a strong holding force on the ferromagnetic washer 17 because there is a complete flux path between the adjoining magnets, which includes the surface of the ferromagnetic support 20 and the ferromagnetic member 17 itself.

Because the sheets 16 are relatively flexible they can be bent into a non-planar form such as illustrated in Figure 3 of the drawings, making it possible to secure the entire magnetic pad assembly by its magnetic attraction to the periphery of a ferromagnetic drum 18. The upper sheet 16 can be suitably secured to the drum 18 or be in the form of a continuous loop, as required.

In the form of the invention illustrated in Figures 4 and 5 of the drawings, we make use of a plurality of wafer-type magnets 21 arranged in side-by-side relation and magnetized along their shortest, or thickness, dimension. In this form of the invention, however, the magnets 21 are oriented so that each of the coplanar magnetic surfaces of the resulting assembly have the same magnetic polarity. In other words, in the illustrated form of the invention, the upper surfaces comprise a north pole surface and the bottom surfaces of the magnets constitute a south pole for the magnetic assembly.

The magnets 21 are disposed on a magnetic supporting plate 22 which is composed of steel or the like. The plate 22 is sufficiently thin to be readily flexible. A plurality of ferromagnetic spacers 23 are secured to the plate 22, or are integral therewith and extend between adjoining magnets 21. As illustrated best in Figure 5 the height of the spacers 23 is somewhat greater than the height of the magnets 21 so that when a ferromagnetic piece 24 is brought into contact with the magnetic assembly, the piece 24 bridges the adjoining spacers 23 without coming into contact with the surface of the magnets 21. In this form of the invention, the magnetic flux must travel through the spacers 23 in order to complete the magnetic circuit. Since the spacers 23 are much smaller in area than the magnets 21, a much higher flux density will exist in the spacers 23 tending to produce a much higher holding force than could be achieved with the magnets alone.

As illustrated in Figure 6, an assembly similar to that shown in Figure 4 can be readily conformed to the periphery 26 of a ferromagnetic drum. However, in this form of the invention, the magnetic support plate 22 is replaced by a nonmagnetic, flexible supporting plate 27 so that the ferro-magnetic surface 26 provides a return path for flux existing between the adjoining magnets 21 in the assembly.

In the form of the invention illustrated in Figures 7 and 8 of the drawings, the supporting plates of the previous embodiments are replaced by a flexible adhesive film which holds the magnets together, but permits flexing of the magnetic pad. The structure illustrated in these two views includes a plurality of wafer-type magnets 31 in side-by-side relation, with the coplanar faces on each side being of the same magnetic polarity, as indicated. Alternate rows of the magnets 31 are separated by ferromagnetic spacers 32 which serve as part of the flux return path for the magnetic assembly.

The magnets 31 and the spacers 32 are covered with a relatively thin film 33 of a flexible adhesive composition, such as the type known as "Pliobond" and sold by the Goodyear Corporation, although other adhesive compositions having elastomeric properties can also be employed. The film 33 extends between the magnets 31 and the spacers 32 as well as providing an overall film coating for the entire assembly. While this type of assembly is not so flexible as the other forms of the invention, it does find use where it is desirable to secure a permanent magnet body to an irregular or non-planar surface.

From the foregoing, it will be apparent that the magnetic pad assemblies of the present invention are extremely compact and provide a large effective magnetic area for unit of thickness. It will also be appreciated that the assemblies are readily engageable and disengageable with ferromagnetic surfaces and are readily adapted to be received on non-planar surfaces such as the periphery of a cylindrical member.

It will be evident that various modifications can be made to the described embodiments without departing from the scope of the present invention.

We claim as our invention:

1. A magnetic pad assembly comprising a plurality of wafer-type permanent magnets arranged in side-by-side relation to provide a pair of planar magnetic faces said magnets being magnetized along their shortest dimension and having two other dimensions substantially longer than said shortest dimension, and being sufficiently close together to enable magnetic flux paths to be set up between adjoining magnets, said magnets being arranged so as to provide faces of the same magnetic polarity in a common plane, a plurality of ferromagnetic spacers between adjoining magnets, and a relatively flexible non-magnetic supporting member abutting all of said faces in one plane.

2. A magnetic pad assembly comprising a plurality of wafer-type magnets arranged in side-by-side relation to provide opposed coplanar magnetic faces, said magnets being magnetized along their shortest dimension, said magnets having two other dimensions substantially larger than the said shortest dimension, and being sufficiently close together to enable magnetic flux paths to be set up between adjoining magnets, said coplanar magnetic faces having a common magnetic polarity, a flexible backing member abutting all of said faces in one plane, and a plurality of ferromagnetic spacers extending between adjoining magnets and functioning as a part of the flux return circuit for said magnets.

References Cited in the file of this patent

UNITED STATES PATENTS

| | | |
|---|---|---|
| 2,389,298 | Ellis | Nov. 20, 1945 |
| 2,389,299 | Ellis | Nov. 20, 1945 |
| 2,595,833 | Flaherty | May 6, 1952 |
| 2,862,752 | Heppner | Dec. 2, 1958 |

FOREIGN PATENTS

| | | |
|---|---|---|
| 880,841 | Germany | June 25, 1953 |